(12) United States Patent
Fujieda et al.

(10) Patent No.: US 6,519,931 B2
(45) Date of Patent: Feb. 18, 2003

(54) DIRECT GASOLINE INJECTION TYPE SPARK IGNITING INTERNAL COMBUSTION ENGINE WITH TURBOCHARGER AND THE ENGINE CONTROL METHOD

(75) Inventors: Mamoru Fujieda, Tomobe-machi (JP); Hiroshi Fujii, Tokyo (JP); Shinji Nakagawa, Tokyo (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

(21) Appl. No.: 09/942,035

(22) Filed: Aug. 30, 2001

(65) Prior Publication Data

US 2002/0134072 A1 Sep. 26, 2002

(30) Foreign Application Priority Data

Mar. 23, 2001 (JP) ........................... 2001-084005

(51) Int. Cl.[7] ................................. F01N 5/04
(52) U.S. Cl. ..................... 60/280; 60/278; 60/287; 60/602; 60/605.2
(58) Field of Search ................... 60/278, 280, 286, 60/602, 605.2, 287

(56) References Cited

U.S. PATENT DOCUMENTS

| | | | |
|---|---|---|---|
| 4,404,804 A | * 9/1983 | Tadokoro et al. | 60/602 |
| 5,709,081 A | * 1/1998 | Bruestle | 60/280 |
| 5,996,347 A | * 12/1999 | Nagae et al. | 60/605.2 |
| 6,276,139 B1 | * 8/2001 | Moraal et al. | 60/605.2 |
| 6,293,095 B1 | * 9/2001 | Yamamoto et al. | 60/286 |

FOREIGN PATENT DOCUMENTS

| | | | |
|---|---|---|---|
| JP | 404166643 | * | 6/1992 |
| JP | 05321643 | | 12/1993 |
| JP | 407332072 | * | 12/1995 |
| JP | 409209742 | * | 8/1997 |
| JP | 411311118 | * | 11/1999 |
| JP | 02001050038 | * | 2/2001 |
| JP | 02001193446 | * | 7/2001 |

* cited by examiner

Primary Examiner—Thomas Denion
Assistant Examiner—Diem Tran
(74) Attorney, Agent, or Firm—Crowell & Moring LLP

(57) ABSTRACT

In a direct gasoline injection type spark igniting internal combustion engine provided with a turbocharger and a catalyst, in order to optimize an exhaust gas control, the structure is made such that an optimum exhaust gas control can be obtained only by one control valve by designing an arrangement of a pre catalyst, the turbocharger and a bypass exhaust gas passage and placing a control valve. Further, a stratified operation area is expanded by reducing a capacity of the turbocharger, shifting an actuation area to a low capacity side and corresponding to an area of a stratified combustion so as to increase an air amount in the stratified area. Accordingly, since it is possible to early warm up a main catalyst at a time of starting the engine, whereby the exhaust gas is purified, and the air amount in the stratified area is increased, the stratified area expands to a high output side and a fuel consumption is improved.

23 Claims, 22 Drawing Sheets

DIRECT GASOLINE INJECTION TYPE SPARK IGNITING INTERNAL COMBUSTION ENGINE WITH TURBOCHARGER AND THE ENGINE CONTROL METHOD

FIELD OF THE INVENTION

The present invention relates to a direct gasoline injection type spark igniting internal combustion engine with turbocharger and the engine control method thereof, and more particularly to a control mechanism and a control method of an exhaust passage.

DESCRIPTION OF THE RELATED ART

Since a direct gasoline injection type spark igniting internal combustion engine directly injects fuel into a cylinder, stratified combustion of collecting and burning fuel near an ignition plug so as to set a lean air fuel ratio as a whole can be conducted. However, in the case of a natural air supply type engine, since an amount of air sucked within the cylinder is small, a range capable of executing a stratified operation is narrow and a sufficient specific fuel consumption improving effect can not be obtained. On the contrary, a system combining a turbocharger and a catalyst (a pre catalyst and a main catalyst) with a conventional direct gasoline injection type spark igniting internal combustion engine is known in Japanese Patent No. 3090536.

In order to increase purification performance at a time of starting an engine, it is general in view of an exhaust countermeasure to additionally provide the pre catalyst assisting the main catalyst near the engine, in addition to the main catalyst placed below a floor of a vehicle body. However, in the case of placing the turbocharger, there is a problem that the turbocharger interferes with the pre catalyst so as to reduce their performances therebetween. As a countermeasure therefor, as shown in Japanese Patent No. 3093536, there is a method of placing valves for switching respective exhaust passages, however, a structure and a control thereof are complex since a number of the valves is increased. Further, in the conventional direct gasoline injection type spark igniting internal combustion engine, there is a problem that an actuation area of the turbocharger does not correspond to the stratified combustion area.

SUMMARY OF THE INVENTION

The present invention simplifies a structure and a control by contriving an arrangement of a pre catalyst, a turbine of a turbocharger and a bypass exhaust passage bypassing the turbine so as to set a control valve to one.

Further, the present invention expands a stratified operation area by reducing a capacity of the turbocharger, and shifting the actuation area thereof to a low capacity side so as to coincide it with the stratified combustion area, thereby increasing an amount of air in the stratified area.

In the present invention, an air-fuel ratio (A/F) is shifted to a rich side in an area that the engine rotational speed increases over one half of the maximum rotational speed.

DESCRIPTION OF THE PREFERRED EMBODIMENTS

Figure 1:
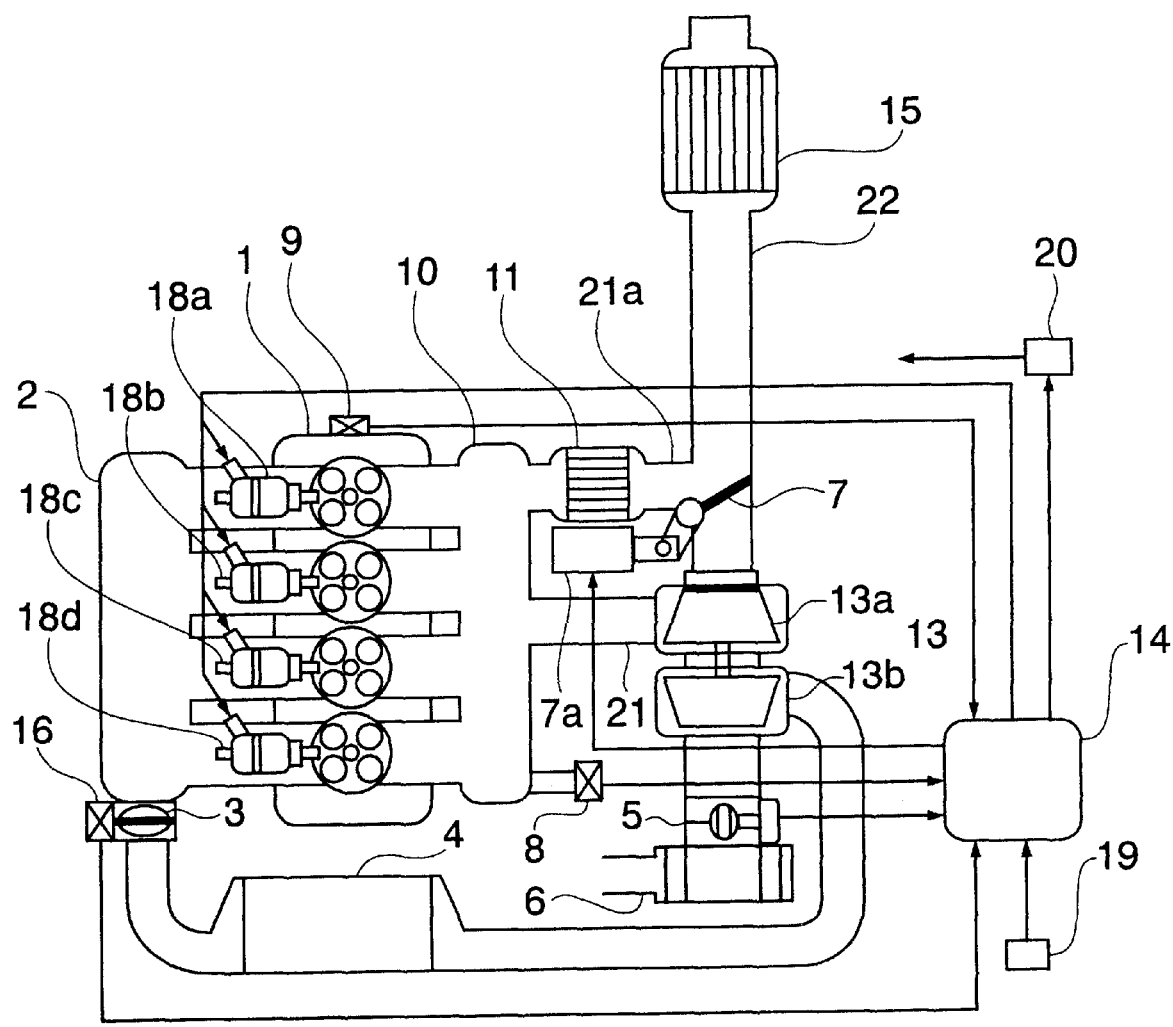
FIG. 1 is a schematic view of a first embodiment in accordance with the present invention.

FIG. 1 shows a schematic view of a first embodiment in accordance with the present invention. A suction pipe 2 and a throttle valve 3 are provided in an engine 1. A suction air enters into the throttle valve 3 via an air cleaner 6, an air flow meter (AFM) 5, a compressor 13b of a turbocharger 13 and an intercooler 4, and is supplied to the engine 1 from the suction pipe 2. An exhaust gas from the engine 1 is discharged to a passage 22 through two passages 21, 21a branched from the exhaust pipe 10 and disposed in parallel to each other. A turbine 13a is arranged on the passage 21, and a pre catalyst 11 is arranged on the passage 21a. In this case, the pre catalyst 11 is structured such as to assist a main catalyst 15. Respective downstream sides of the pre catalyst 11 and the turbine 13a communicate with a control valve 7, are combined so as to enter to the passage 22, and communicate with the main catalyst 15. An angle signal of a crank angle sensor 19 in the engine and an air amount signal of the AFM 5 are input to an engine control unit (ECU) 14, and an ignition signal and drive signals for fuel injection valves 18a, 18b, 18c and 18d are output via an ignition apparatus 20. Further, a signal for controlling an actuator 7a of the control valve 7 is output, and an exhaust gas pressure signal of the exhaust gas pressure sensor 8 and an idle switch (SW) signal for detecting a position of the throttle valve 3 are applied. Since an upstream pressure of the turbocharger is applied to the pre catalyst by placing the control valve 7 downstream the pre catalyst, it is possible to set a temperature of the pre catalyst higher than that in the case of attaching the control valve upstream the pre catalyst.

Figure 2:
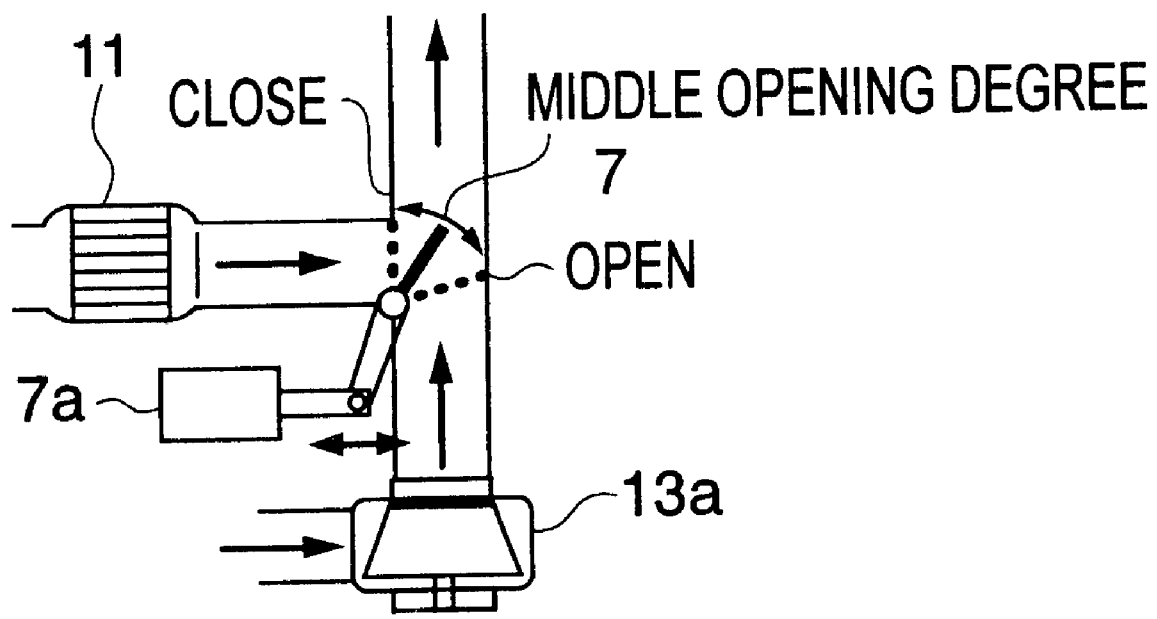
FIG. 2 is an operation view of a control valve in the first embodiment.

FIG. 2 shows an operation of the control valve 7 in accordance with the first embodiment shown in FIG. 1. The control valve 7 is controlled to a closed position, a middle opening degree and an open position by the actuator 7a. In the case of the closed position, a passage for the pre catalyst is closed (a turbo side passage is opened). In the case of the open position, a passage for the pre catalyst is opened (the turbo side passage is closed). In the case of the middle opening degree, the passages on both sides are opened, and the exhaust gas flows through both passages. A position in the case of the middle opening degree is changed on the basis of an exhaust gas amount and an exhaust gas pressure.

Figure 3:
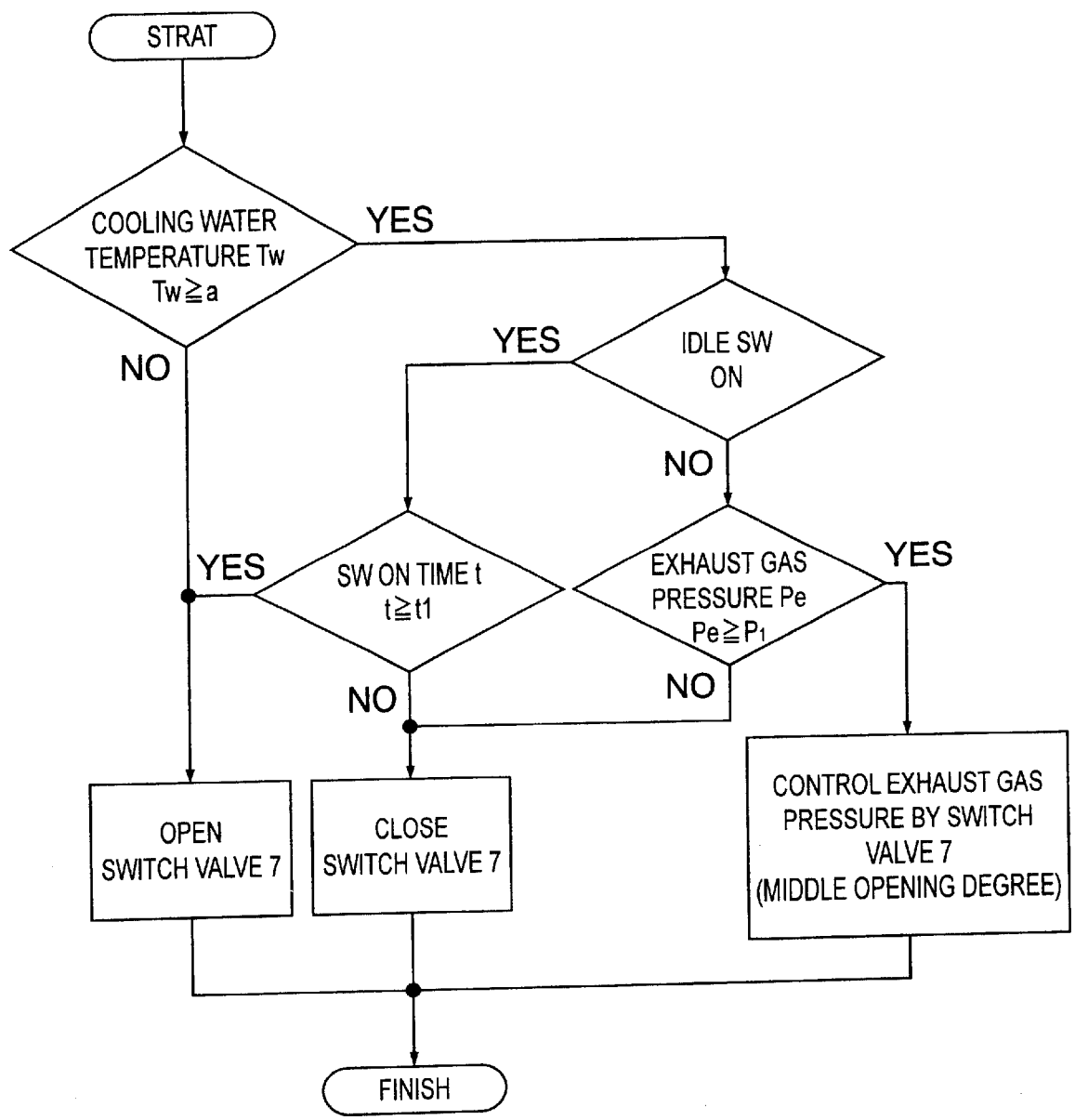
FIG. 3 is an operation flow chart of the control valve in the first embodiment.

FIG. 3 is a control method of the control valve 7 in accordance with the first embodiment shown in FIG. 1. At first, a judgement of a cooling water temperature Tw is executed. In the case that the relation Tw≧a is No, the engine is under warming up, and the process is finished by opening the control valve 7 (the exhaust gas is flowed only through the pre catalyst). In the case that the relation Tw≧a is Yes, a judgement of an idle SW is executed. In the case that a condition of the idle SW ON is Yes, a time t that the SW is ON is judged. In the case that the relation t≧t1 is Yes, the process is finished by opening the control valve 7. Immediately after the engine returns to the idle state from a traveling state (a load operation), the main catalyst maintain an activation due to the remaining heat, and it is not necessary to immediately use the pre catalyst. In the case that the relation t≧t1 is No, the process is finished by closing the control valve 7 (the exhaust gas is flowed only through the turbocharger 13). When the idle period becomes certainly long, an effect of the remaining heat of the main catalyst is lost, and it is necessary to use the pre catalyst. Further, it is possible to reduce a frequency of use of the control valve 7 by using a timer in the manner mentioned above, and it is useful to improve a durability of the control valve. In the case that the condition of the idle SW ON is No, a judgement of an exhaust gas pressure Pe is executed. In the case that the relation Pe≧P1 is No, the process is finished by closing the control valve 7. In the case that the relation Pe≧P1 is Yes, the process is finished by opening the control valve 7 at a middle opening degree so that Pe becomes P1 so as to control the exhaust gas pressure.

Figure 4:
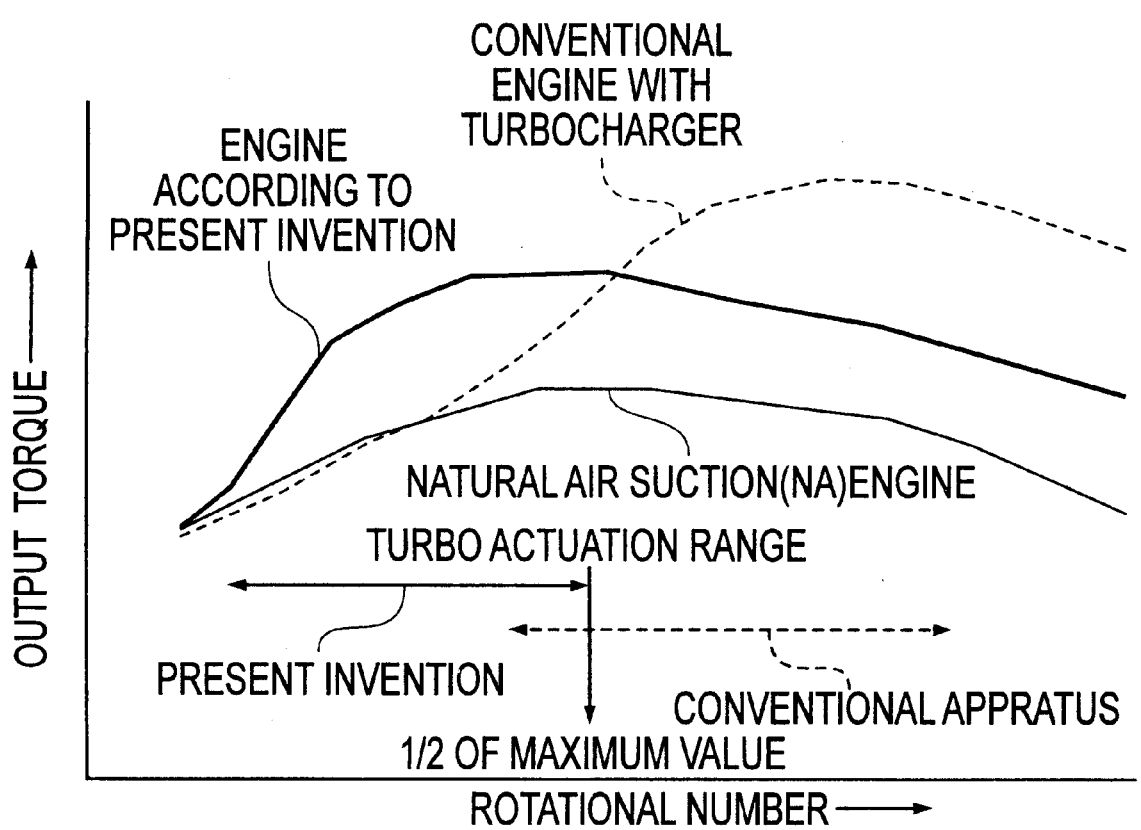
FIG. 4 is a schematic view of a rotational number and an output torque of an engine according to the present invention.

FIG. 4 shows a relation between a rotational number of the engine and an output torque. In the conventional engine with the turbocharger, a supercharge is started from a point close to one half of a maximum rotational number, and an output torque becomes larger than that of a natural air supply engine in an area having a great engine rotational number. On the contrary, in the engine in accordance with the present invention, weight saving is achieved by making the turbocharger compact and shifting the actuation range of the turbocharger to a low rotational number side. As a result, in the engine in accordance with the present invention, the output torque is increased from the low rotational number range of the engine. However, since the turbocharger is made compact and light, the exhaust gas pressure becomes too high in a high rotational number side (near substantially one half of the maximum rotational number) in which the exhaust gas amount of the engine is increased. Accordingly, the passage (the conventional waist gate valve) for bypassing the turbocharger is opened earlier (at the lower rotational number) than the conventional engine with the turbocharger, and the output torque becomes smaller than that of the conventional apparatus on the high rotational number side.

Figure 5:
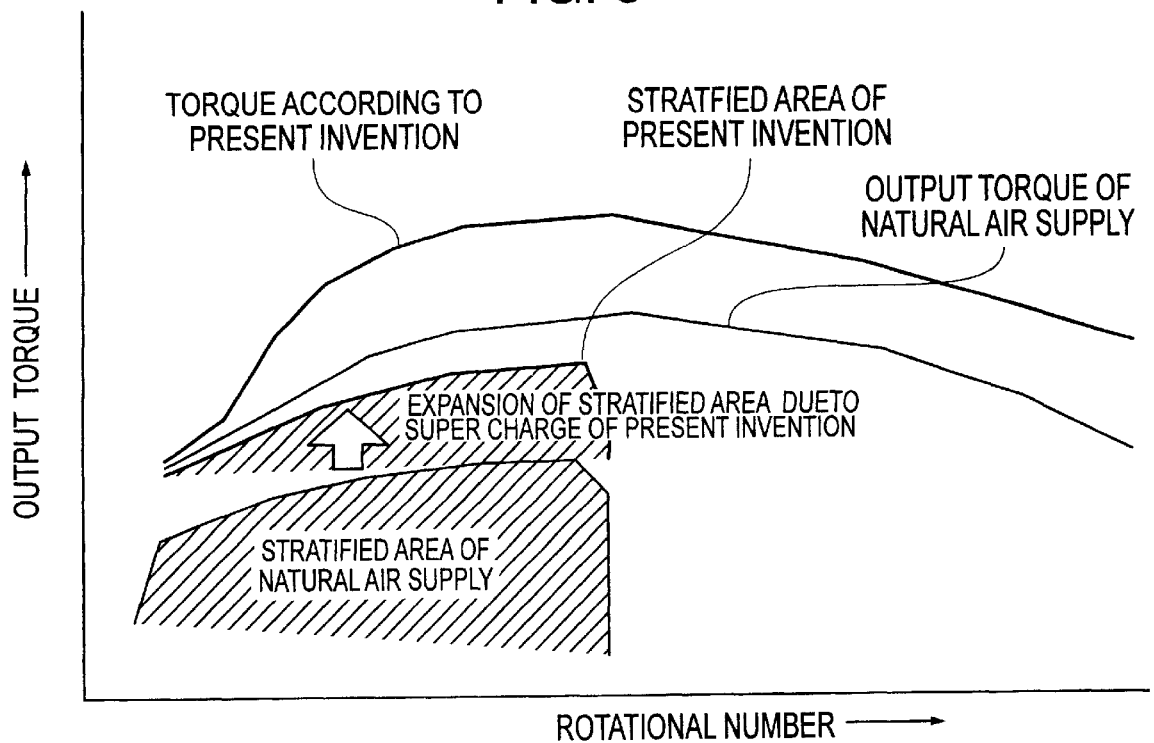
FIG. 5 is a schematic view showing one example of an effect according to the present invention.

FIG. 5 shows an effect of the present invention, and shows a relation between the engine rotational number and the output torque. An air amount in the low rotational number range is increased by additionally providing the turbocharger in accordance with the present invention, and it is possible to expand the stratified area of the conventional natural air supply to the large output torque. As a result, a fuel consumption is improved.

Figure 6:
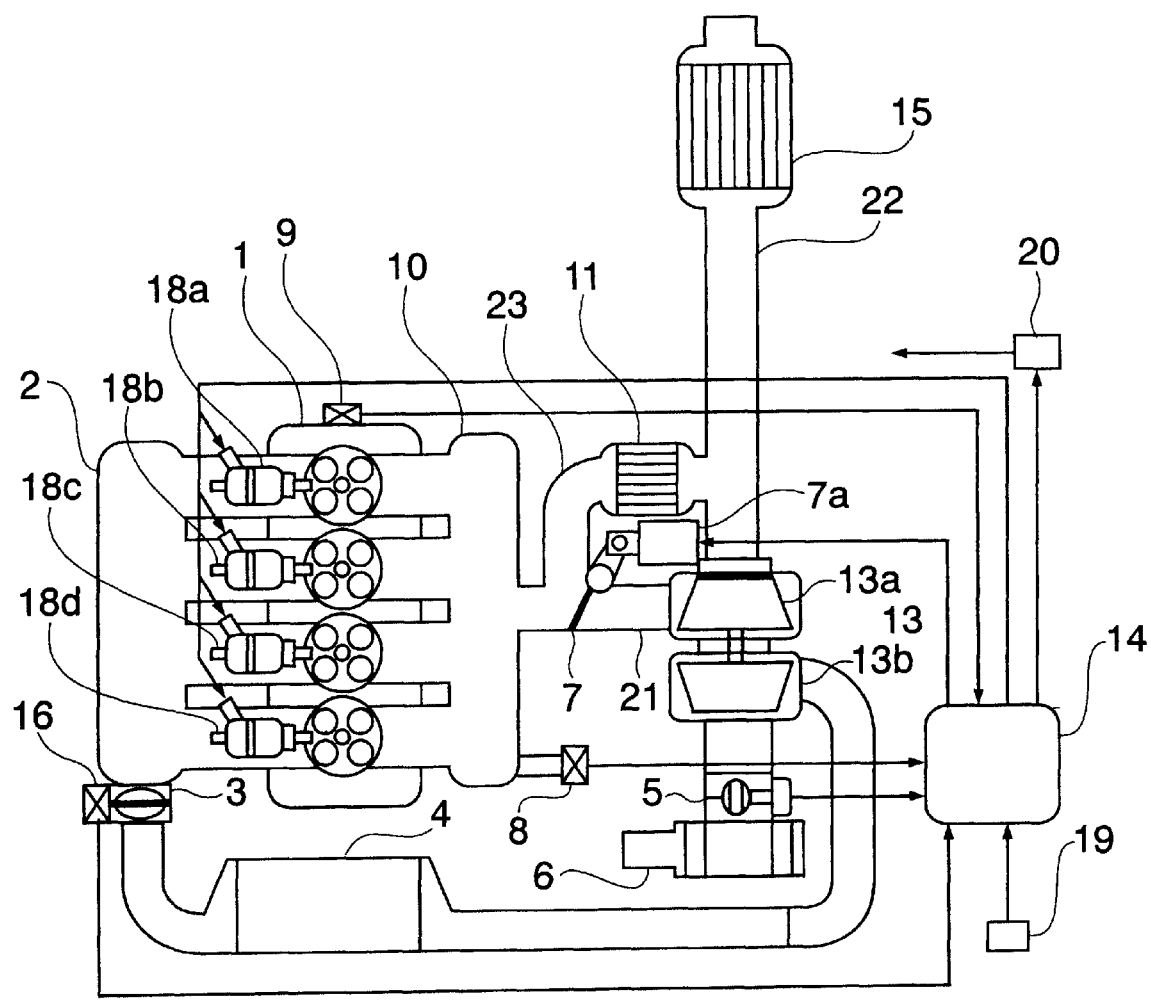
FIG. 6 is a schematic view of a second embodiment in accordance with the present invention.

FIG. 6 shows a second embodiment in accordance with the present invention. The passage 21 is communicated with the exhaust pipe 10, and the control valve 7 is placed there. The passage 21 is connected to the turbine 13a of the turbocharger. On the other side, a passage 23 is branched from the control valve 7 and is communicated with the pre catalyst 11. When the control valve 7 is attached to the upstream of the pre catalyst 11 in the manner mentioned above, a heat insulating effect of the pre catalyst 11 at a time when the control valve 7 is closed is reduced, however, the same effects as that in FIG. 1 are expected except the above effect.

Figure 7:
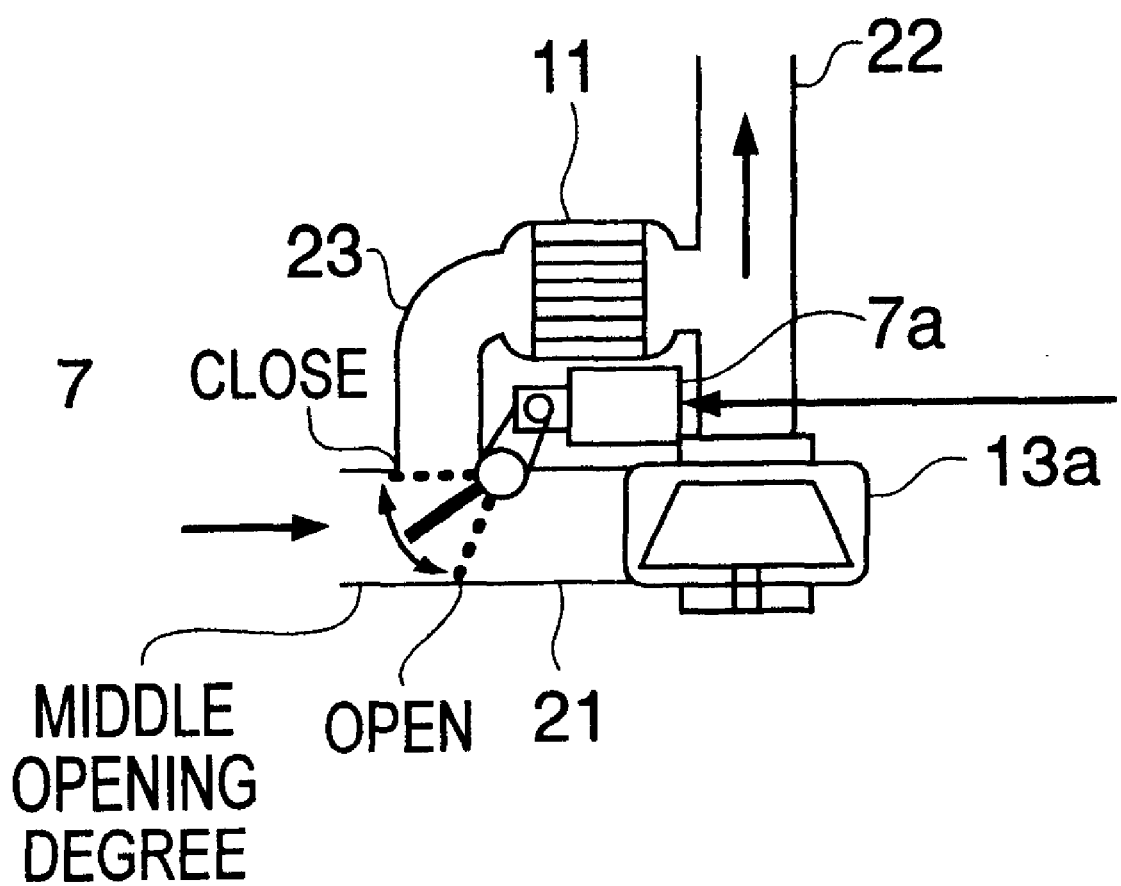
FIG. 7 is an operation view of a control valve in accordance with the second embodiment.

FIG. 7 describes an operation of the control valve 7 in accordance with the second embodiment shown in FIG. 6. In the case that the control valve 7 is at the closed position, the passage 23 corresponding to the passage for the pre catalyst 11 is closed. In the case that the control valve 7 is at the open position, the passage 23 is inversely opened and the passage 21 is closed. A control method of the control valve 7 is the same as that in FIG. 3.

Figure 8:
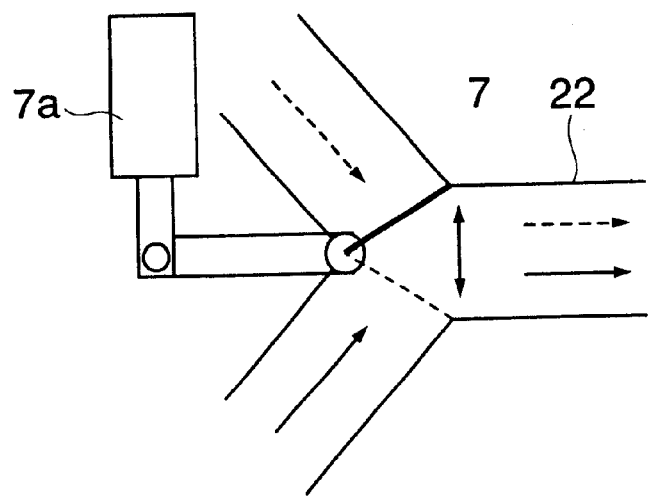
FIG. 8 is a schematic view of an exhaust passage in accordance with the second embodiment.
Figure 9:
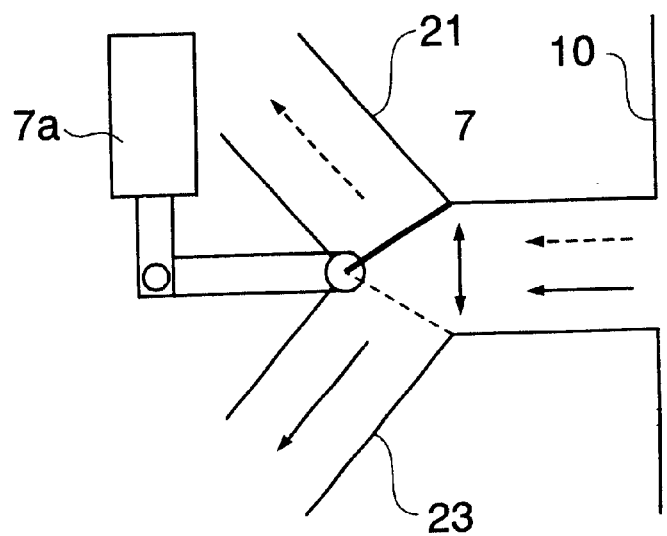
FIG. 9 is a schematic view of the exhaust passage in accordance with the second embodiment.

FIGS. 8 and 9 show an example of a passage structure of the control valve 7. The passage is formed in a T-shaped pipe shape in FIGS. 1 and 6, however is formed in a Y-shaped pipe shape in the present embodiment. FIG. 8 shows a case of confluence of the flows and FIG. 9 shows a case of separation of the flows. In both cases, the rotational angle of the control valve 7 can be made smaller than that of the T-shaped pipe. Further, since a curve of an exhaust gas flow is the same in both passages, there is no difference between flow resistances caused by the passages.

Figure 10:
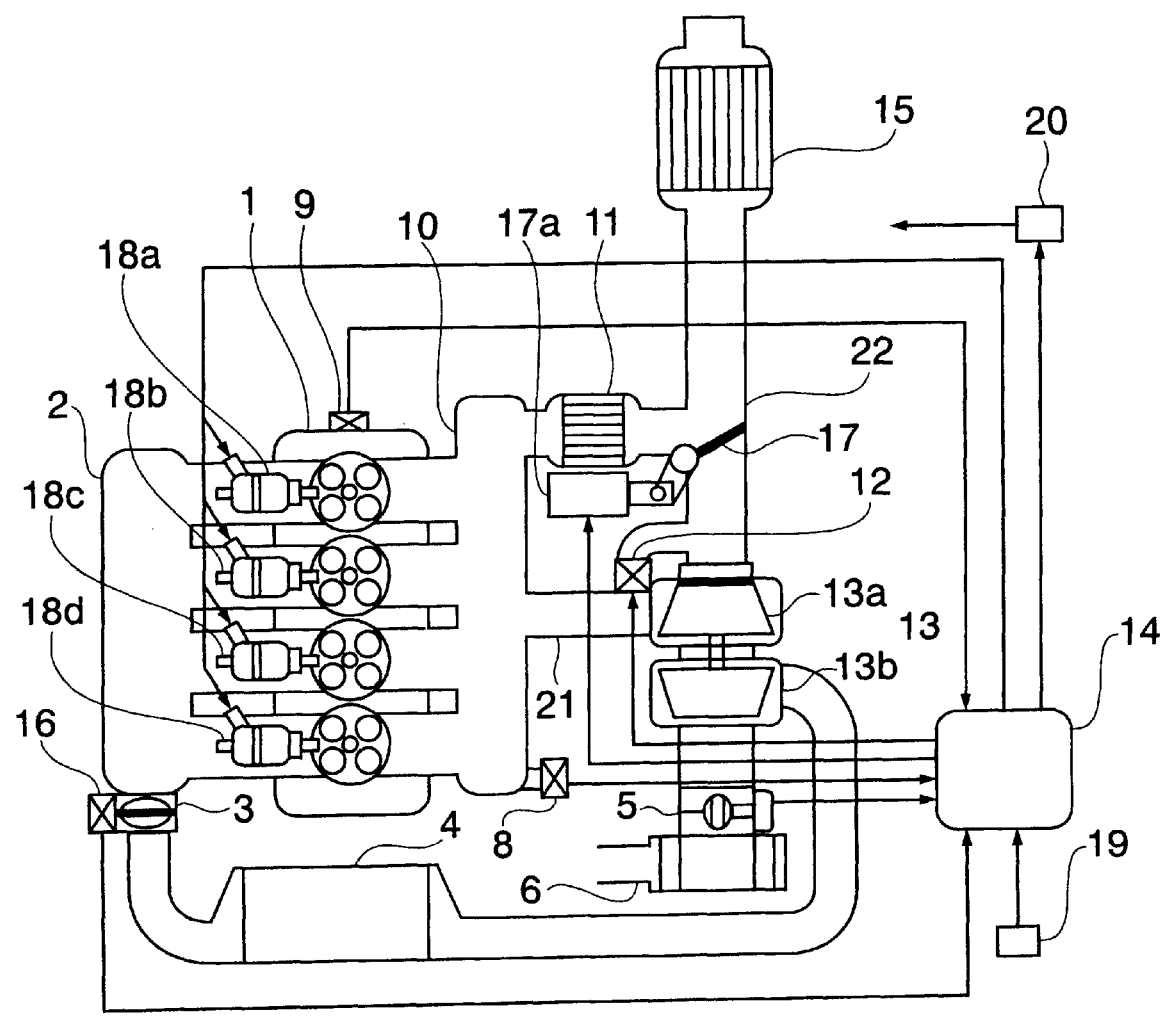
FIG. 10 is a schematic view of a third embodiment in accordance with the present invention.

FIG. 10 shows a third embodiment in accordance with the present invention, in which the control valve employs a control valve 17 having a two-position motion between "open" and "close". Accordingly, a waist gate valve 12 is placed so as to bypass the turbine 13a. The control valve can be simplified by employing the two-position motion valve to the control valve. Further, although the waist gate valve 12 is newly required, the similar structure has been conventionally provided in the turbocharger, so that a mechanical improvement is reduced.

Figure 11:
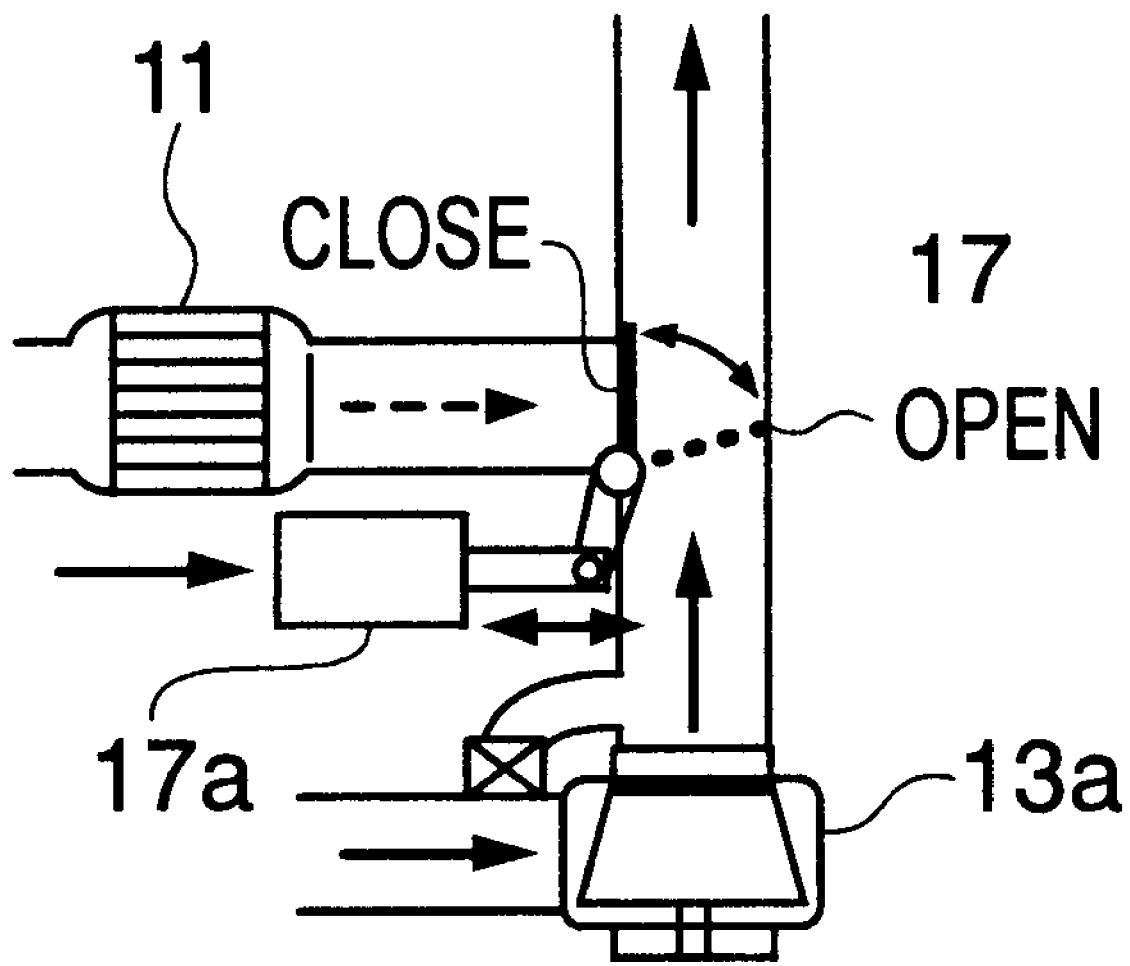
FIG. 11 is an operation view of a control valve in accordance with the third embodiment.

FIG. 11 shows a motion of the control valve 17 in accordance with the third embodiment. The passage of the pre catalyst is opened (the turbine 13a is closed) at the open position. The turbine 13a side is opened (the pre catalyst 11 side is closed) at the closed position.

Figure 12:
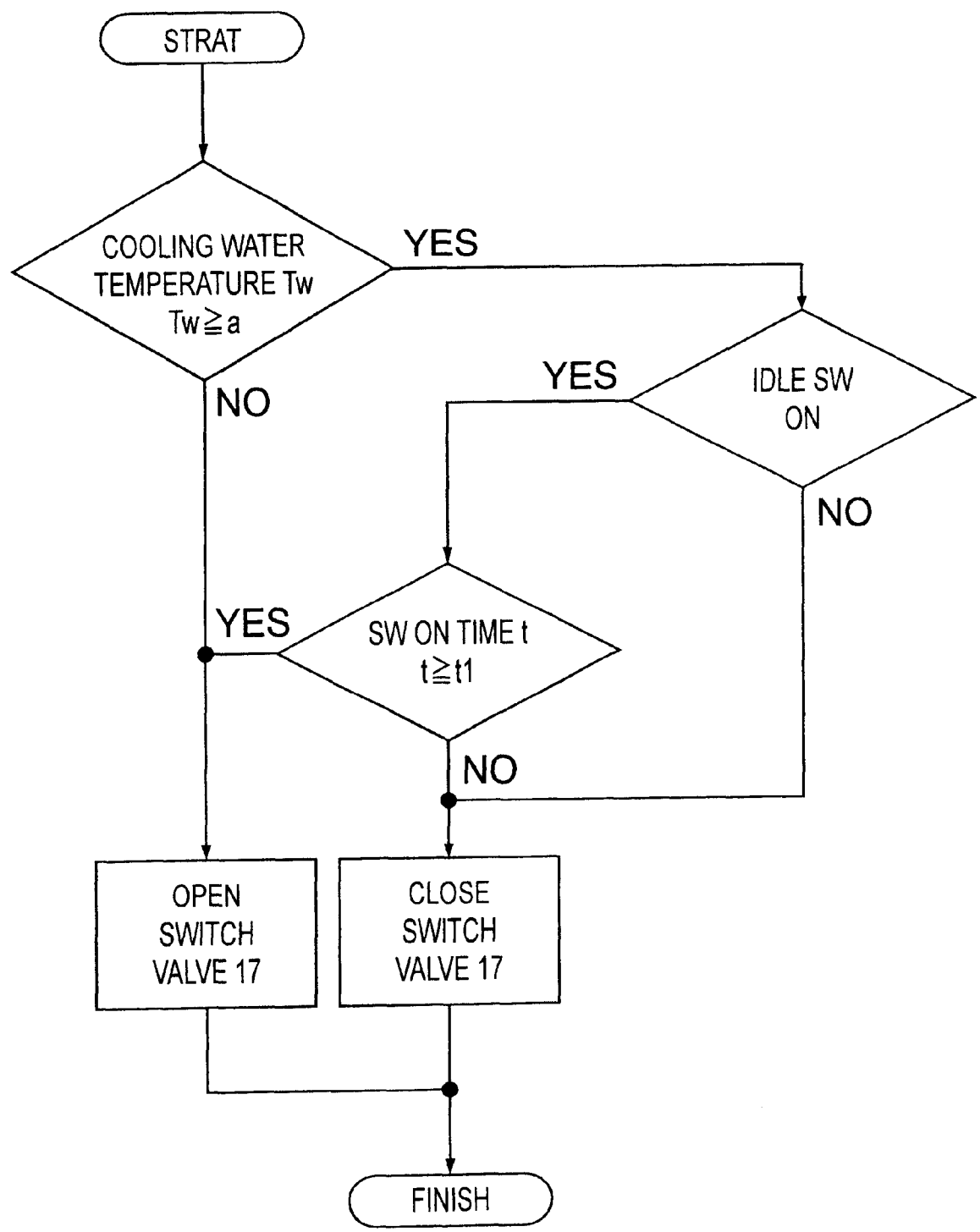
FIG. 12 is an operation flow chart of the control valve in accordance with the third embodiment.

FIG. 12 shows a control flow chart of the control valve 17 in accordance with the third embodiment. At first, a cooling water temperature Tw is judged. In the case that the relation Tw≧a is No, the engine is under warming up, and the process is finished by opening the control valve 17. In the case that the relation Tw≧a is Yes, a judgement of an idle SW is executed. In the case that a condition of the idle SW ON is Yes, a time t that the SW is ON is judged. In the case that the relation t≧t1 is Yes, the process is finished by opening the control valve 17. In the case that the relation t≧t1 is No, the process is finished by closing the control valve 17. In the case that the condition of the idle SW ON is No, the process is finished by closing the control valve 17.

Figure 13:
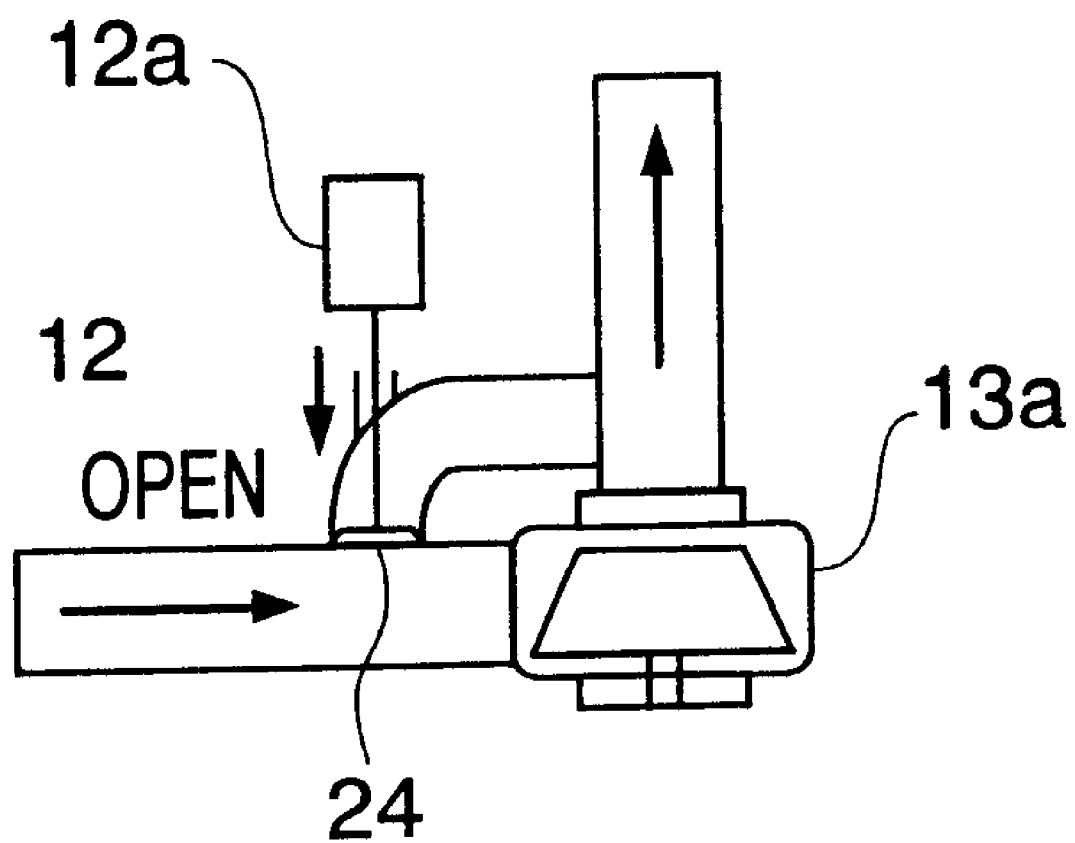
FIG. 13 is an operation view of a waist gate valve in accordance with the third embodiment.

FIG. 13 shows a structure of the waist gate valve 12 in accordance with the third embodiment. When a valve opening signal is input to an actuator 12*a,* a valve 24 is opened in correspondence to a magnitude thereof, and the exhaust gas flows so as to bypass the turbine 13*a,* thereby controlling the exhaust gas pressure.

Figure 14:
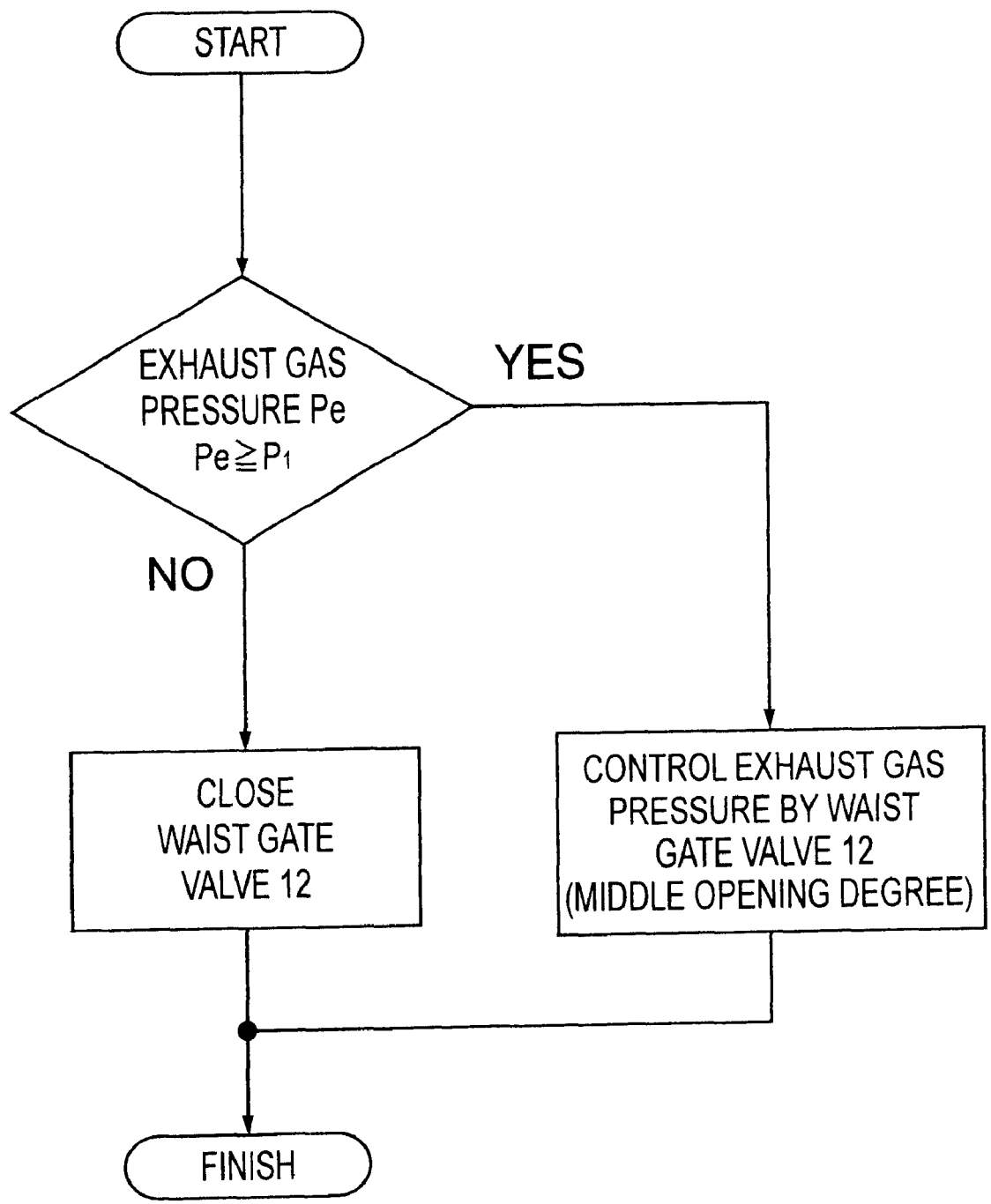
FIG. 14 is an operation flow chart of the waist gate valve in accordance with the third embodiment.

FIG. 14 shows a control method of the waist gate valve 12 in accordance with the third embodiment. The waist gate valve 12 in accordance with the present invention controls the exhaust gas pressure to a predetermined value. At first, a judgement of an exhaust gas pressure Pe is executed. In the case that the relation Pe≧P1 is No, the process is finished by closing the waist gate valve 12. In the case that the relation Pe≧P1 is Yes, the process is finished by controlling the exhaust gas pressure (the middle opening degree) by the waist gate valve 12.

Figure 15:
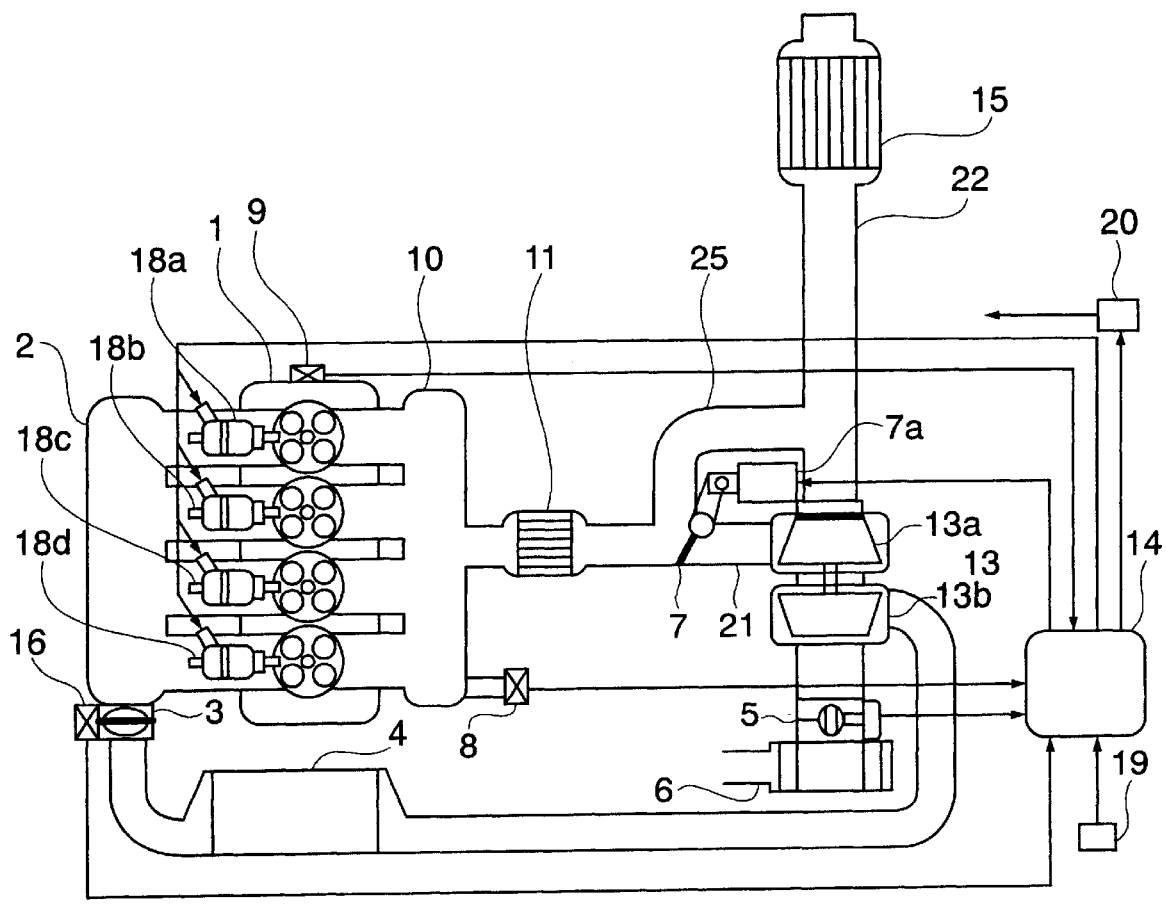
FIG. 15 is a schematic view of a fourth embodiment in accordance with the present invention.

FIG. 15 shows a fourth embodiment in accordance with the present invention. This embodiment corresponds to an embodiment in which the pre catalyst 11 is positioned on the upstream side of the turbine 13*a* in the structure in which the pre catalyst and the turbine 13*a* are arranged in series and a passage 25 bypassing the turbine 13*a* is placed. The control valve 7 is placed in a branch portion between the passage 21 and the passage 25.

Figure 16:
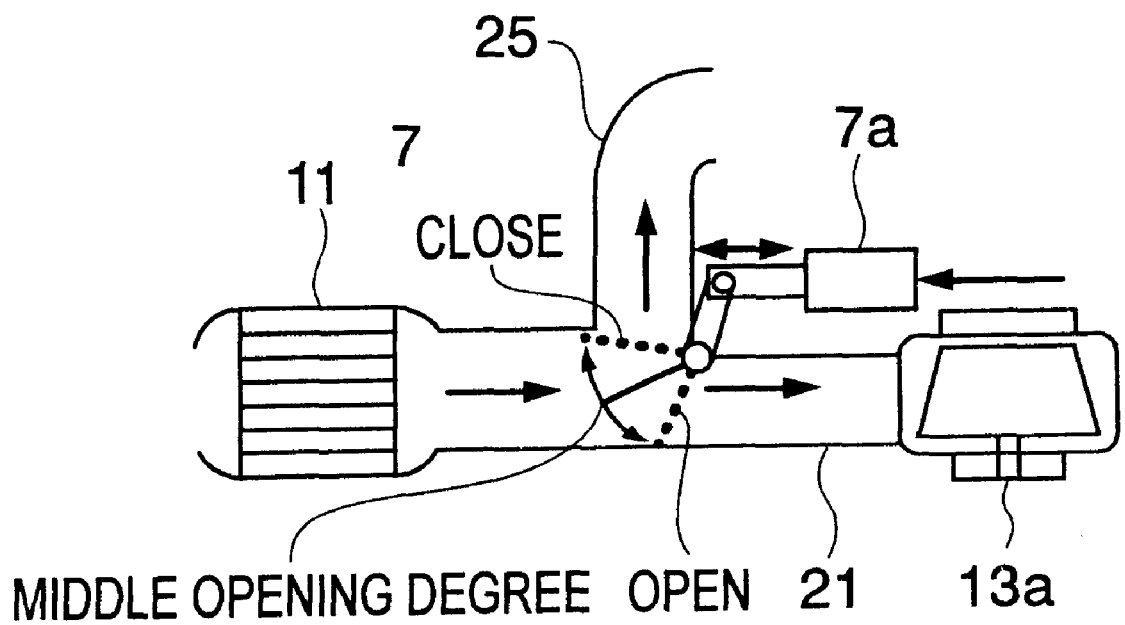
FIG. 16 is an operation view of a control valve in accordance with the fourth embodiment.

FIG. 16 is an operation view of the control valve 7 in accordance with the fourth embodiment. When the control valve 7 is at the open position, the exhaust gas flows only through the passage 25. When the control valve 7 is at the closed position, the exhaust gas flows to the turbine 13*a* side. In the case of executing the exhaust gas pressure control, the valve is at the middle opening degree, and the exhaust gas flows through both of the passages 21 and 25.

Figure 17:
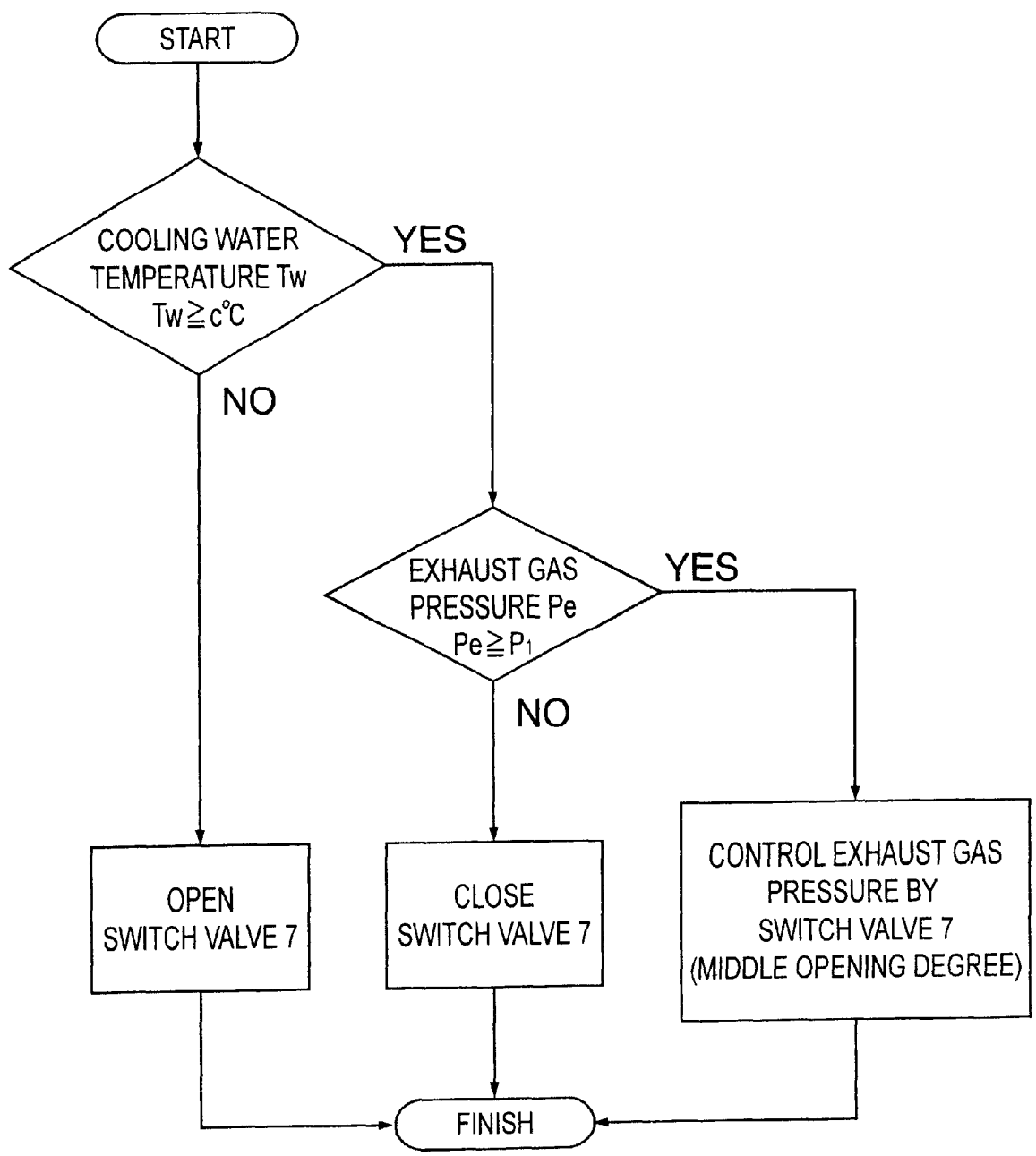
FIG. 17 is an operation flow chart of the control valve in accordance with the fourth embodiment.

FIG. 17 is a control flow chart of the control valve 7 shown in FIG. 16. At first, a judgement of a cooling water temperature Tw is executed. In the case that the relation Tw≧c °C. is No, the process is finished by opening the control valve 7. In the case that the relation Tw≧c °C. is Yes, a judgement of an exhaust gas pressure Pe is executed. In the case that the relation Pe≧P1 is No, the process is finished by closing the control valve 7. In the case that the relation Pe≧P1 is Yes, the exhaust gas pressure control is executed by the control valve 7 (the middle opening degree).

Figure 18:
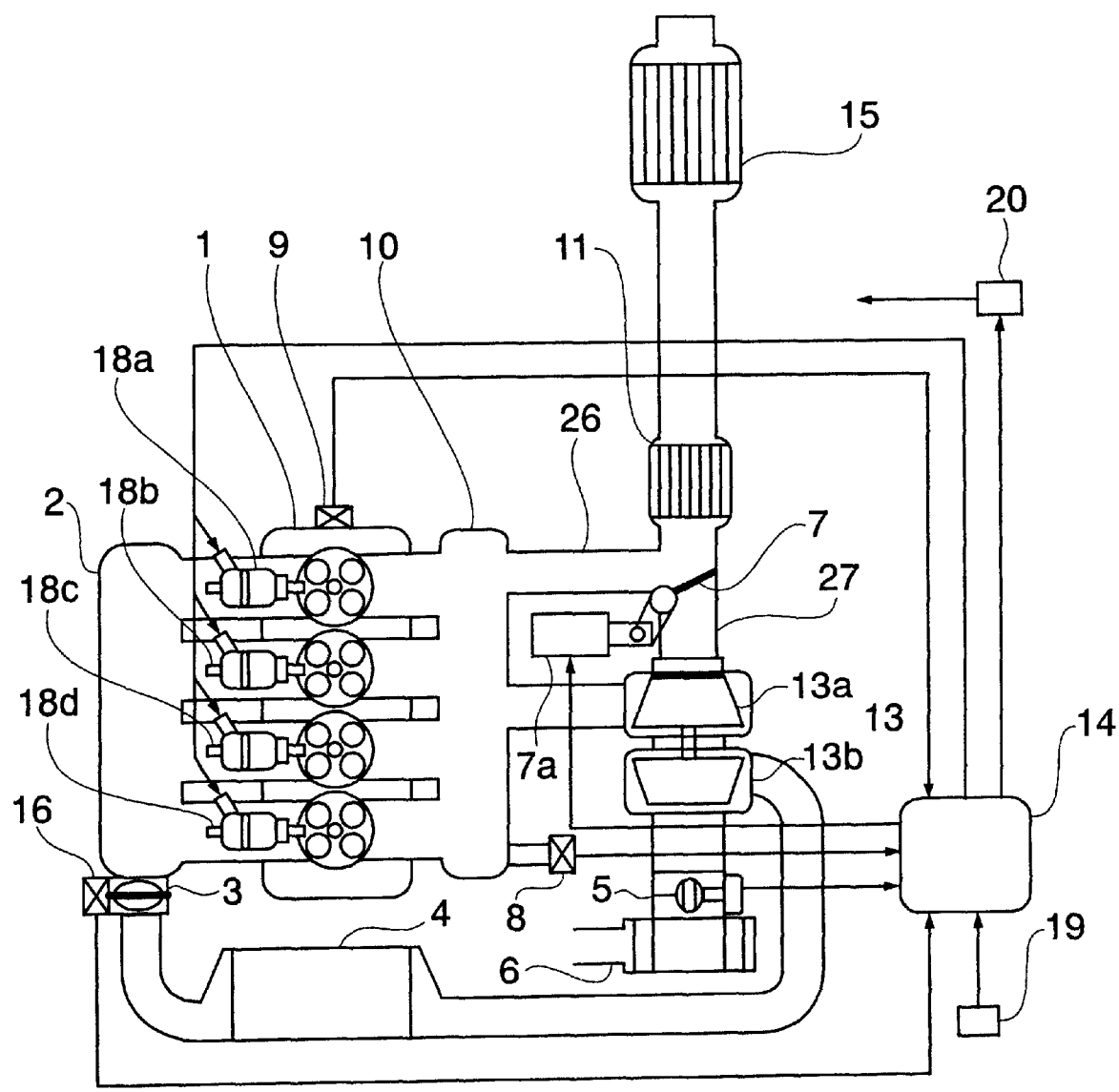
FIG. 18 is a schematic view of a fifth embodiment in accordance with the present invention.

FIG. 18 shows a fifth embodiment in accordance with the present invention. This embodiment corresponds to an embodiment in which the pre catalyst 11 is positioned on the downstream side of the turbine 13*a* in the structure in which the pre catalyst and the turbine 13*a* are arranged in series and a passage 26 bypassing the turbine 13*a* is placed. The control valve 7 makes the passage 26 and a passage 27 confluent.

Figure 19:
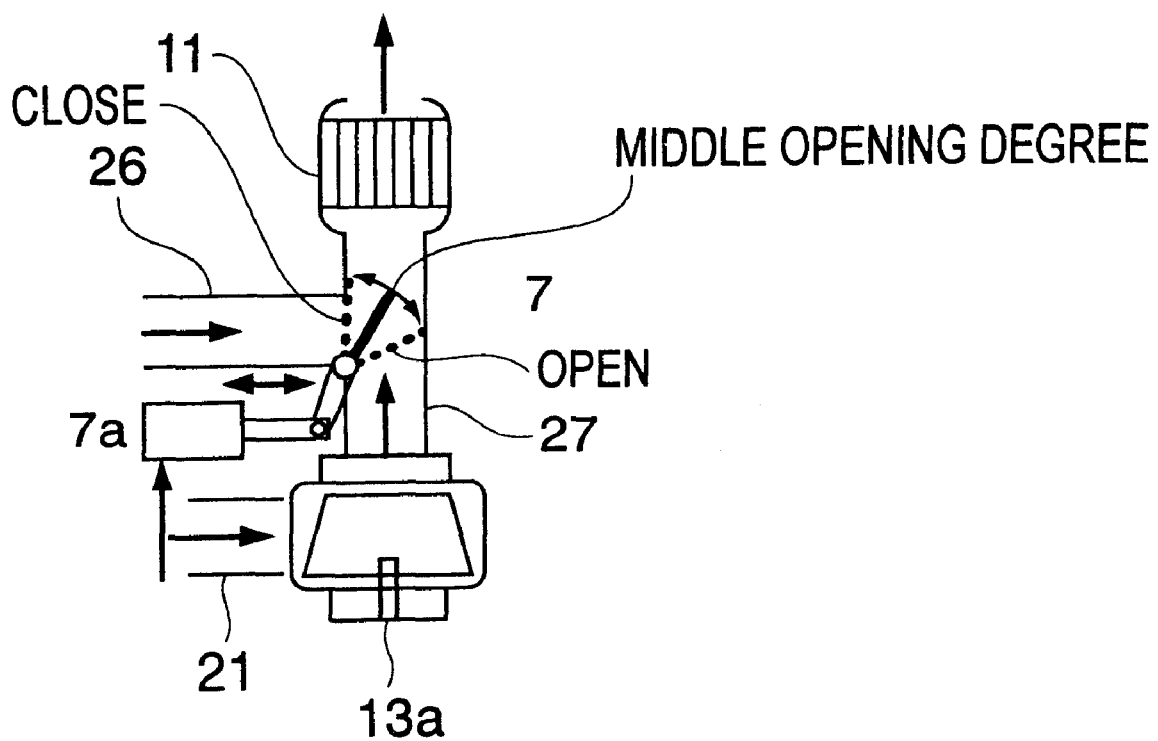
FIG. 19 is an operation view of a control valve in accordance with the fifth embodiment.

FIG. 19 is an operation view of the control valve 7 in accordance with the fifth embodiment. The closed position of the control valve 7 corresponds to a state that the passage 26 is closed. The open position of the control valve 7 corresponds to a state that the turbine 13*a* is closed. The middle opening degree corresponds to a state that the exhaust gas flows through both of the passages 27 and 26 and the exhaust gas pressure control is executed. The control flow is the same as that shown in FIG. 17.

Figure 20:
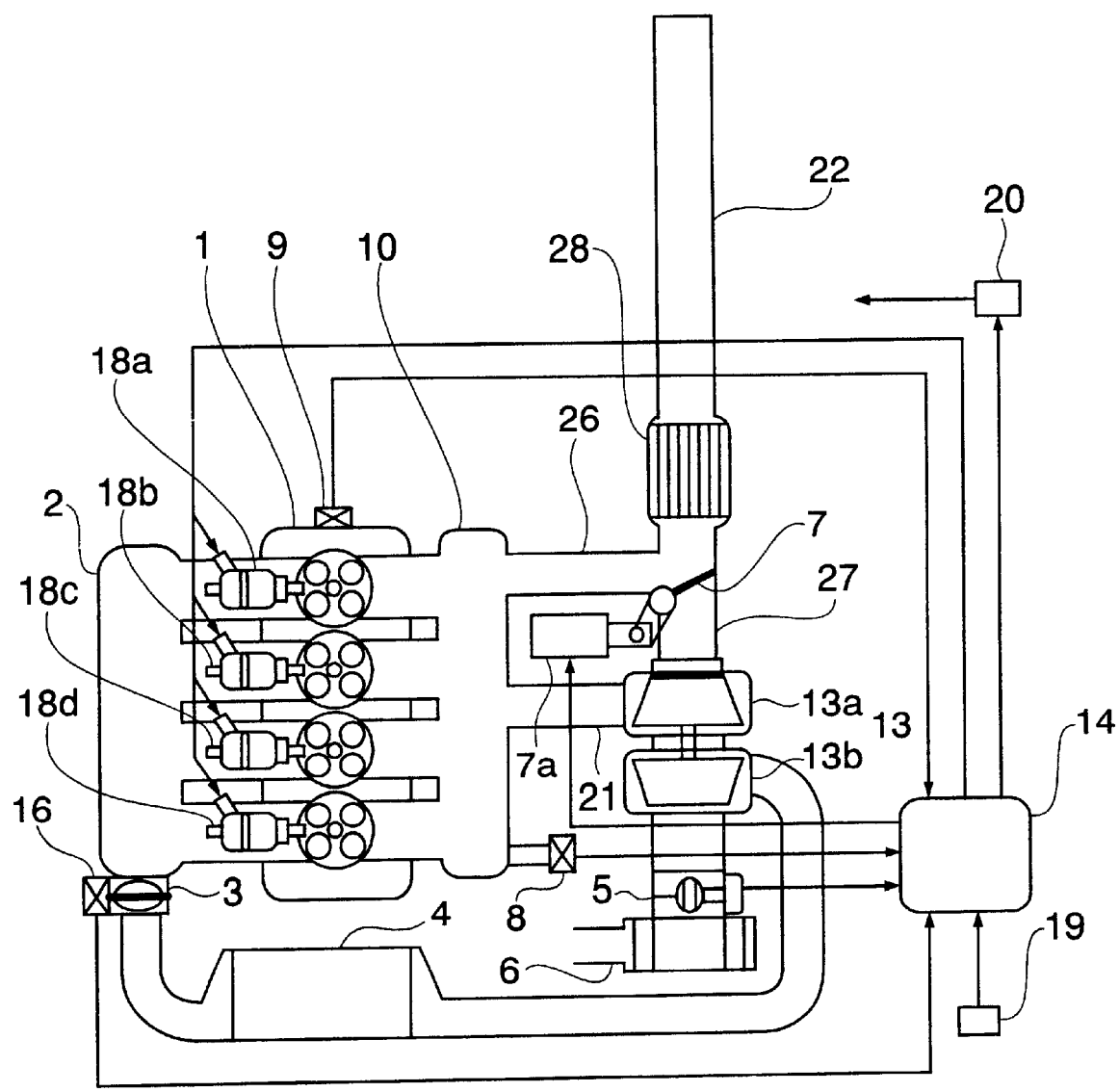
FIG. 20 is a schematic view of a sixth embodiment in accordance with the present invention.

FIG. 20 shows a sixth embodiment in accordance with the present invention in which for omitting the conventional main catalyst, a so-called manifold catalyst 28 having one catalyst placed at a position close to the engine is combined with the pre catalyst of which the capacity is increased. The main catalyst conventionally placed in the passage 22 is omitted. The mounting and the operation of the control valve 7 are the same as those in FIG. 18.

Further, in each of the embodiments shown in FIGS. 6, 15, 18 and 20, in the same manner as that of the third embodiment shown in FIG. 10, it is possible to place the waist gate valve 12, and the control valve can be replaced by the two-position motion valve.

Figure 21:
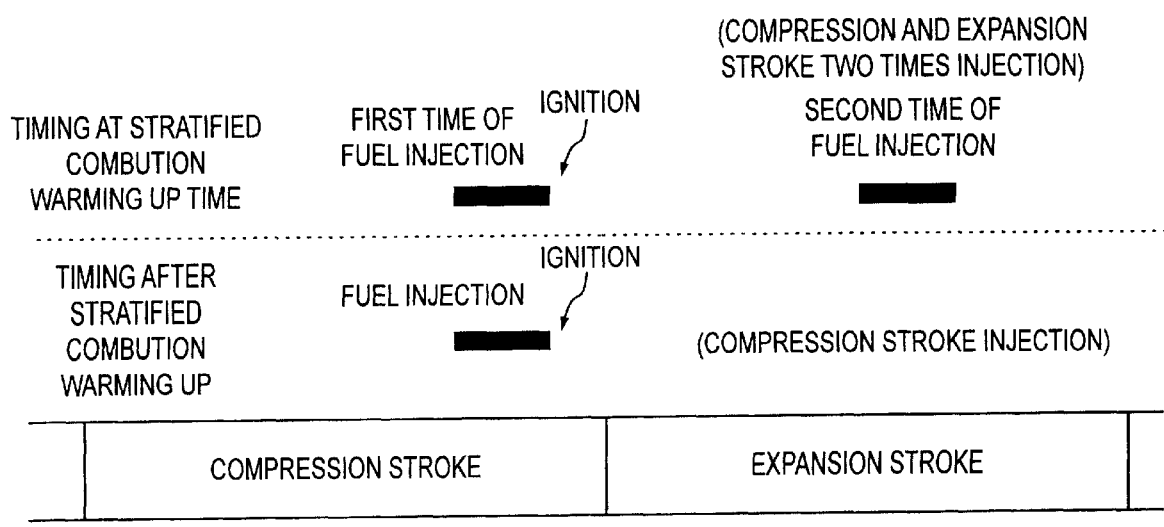
FIG. 21 is a schematic view of a fuel injection timing in the embodiments according to the present invention.

FIG. 21 shows a fuel injection method at a time of starting and warming up of the engine. In the timing after finishing the warming-up executed in the normal operation, there is executed a so-called compression stroke injection of injecting the fuel at a rear half of the compression stroke, forming the mixture in a stratified state and igniting the mixture. However, at a time of starting and warming up, an early warming-up of the exhaust gas system including the pre catalyst for a short time is important in view of an improvement of an exhaust performance. The fuel is injected at a specific injection timing for warming up, and an engine warm up condition of stratified combustion is executed. That is, a first time fuel injection is executed at a rear half of the compression stroke in the same manner as the normal operation, and an ignition is executed. Next, the engine proceeds on to an expansion stroke, however, a second time fuel injection which is substantially the same as the first time injection is executed at a rear half of the expansion stroke. Since the fuel injected at the second time is hardly converted into work and is exhausted, the exhaust gas temperature is raised, and the fuel contributes to the temperature up of the exhaust system. When the present invention is combined with the two-time injection in the compression and the expansion strokes, the engine warm up time can be further reduced, and an exhaust gas purification effect can be improved.

Figure 22:
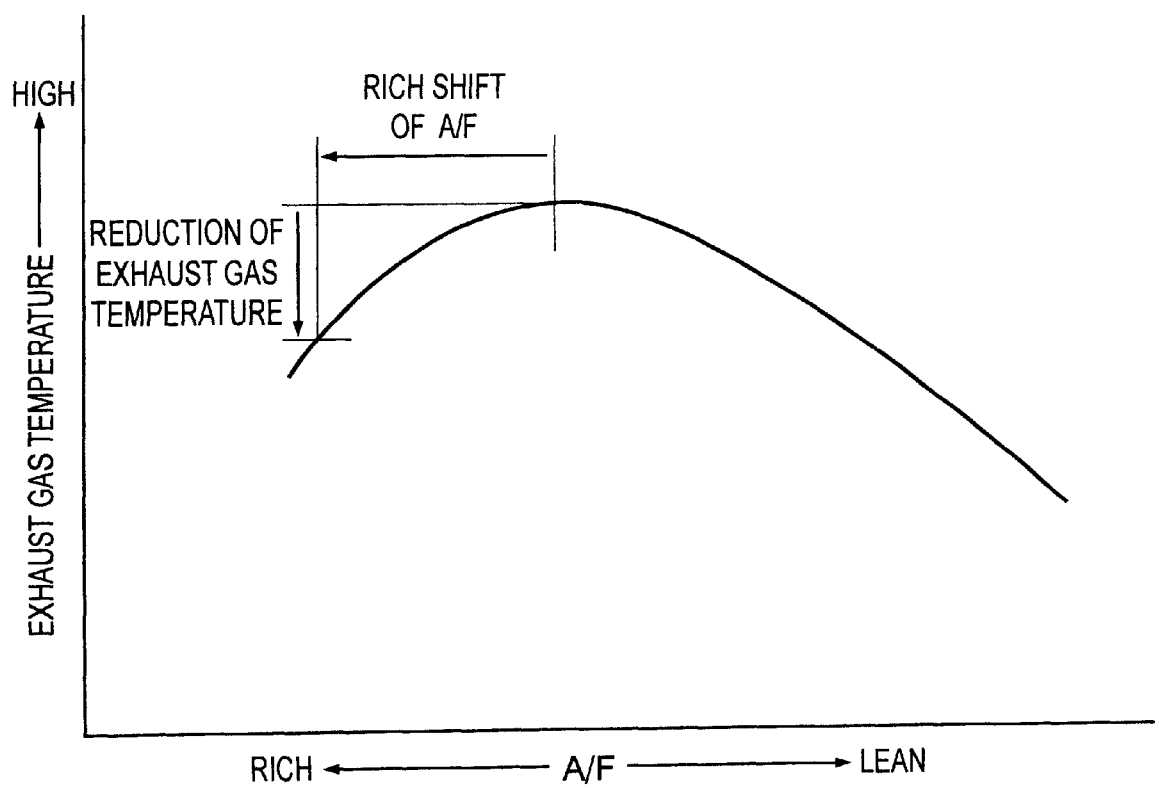
FIG. 22 is a schematic view showing a relation between an air/fuel (A/F) ratio and an exhaust gas temperature in an engine.

FIG. 22 shows a relation between the A/F and the exhaust gas temperature. There is known a characteristic that an exhaust gas temperature achieves a maximum temperature on a little rich side in comparison with a theoretical air fuel ratio, and the temperature is reduced on either of a lean side or a rich side in comparison thereof. In the case that the exhaust gas amount is increased, the exhaust gas pressure becomes high and the exhaust gas bypasses the turbine, as in the embodiments in accordance with the resent invention, there is a case that the pre catalyst is exposed to the high temperature exhaust gas and a durability of the catalyst is reduced. In the case mentioned above, there is employed a method of shifting the air fuel ratio of the mixture supplied to the engine to a rich side and reducing the exhaust gas temperature. In accordance with the present invention, these methods are also effective means.

Figure 23:
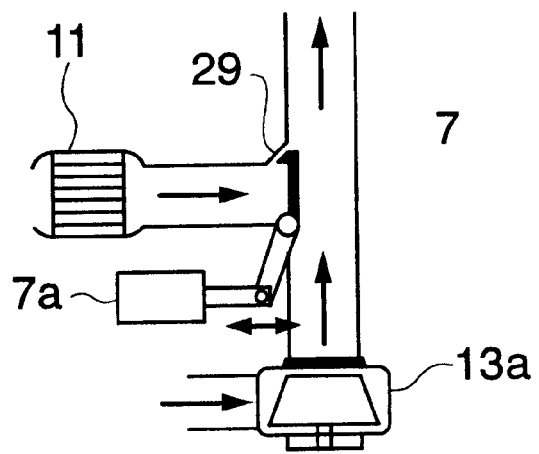
FIG. 23 is a schematic view of a control valve in a seventh embodiment according to the present invention.

FIG. 23 shows a seventh embodiment in accordance with the present invention in which a bypass passage 29 always bypassing a part of the exhaust gas is added to the control valve 7. With the structure, the exhaust gas always flows through the pre catalyst, and an activation is kept. In the seventh embodiment shown in FIG. 23, there is shown a case that the control valve 7 is placed in a confluent portion downstream of the pre catalyst 11 and the turbine 13*a*. In the case of placing the control valve 7 in the branch portion upstream of both of them, the present embodiment is also effective. It is effective for raising the temperature of the pre catalyst and keeping the activation to attach the bypass passage 29 to the pre catalyst side.

Figure 24:
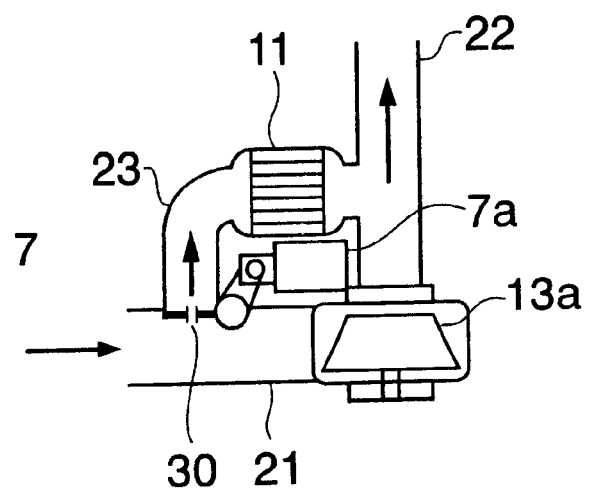
FIG. 24 is a schematic view of a control valve in an eighth embodiment according to the present invention.

FIG. 24 is an eighth embodiment in accordance with the present invention in which a hole 30 is pierced to the control valve 7 and a part of the exhaust gas is always bypassed. When piercing the hole 30 in the control valve 7, a part of the exhaust gas flows to the turbine 13a even in the case of closing the turbine 13a, so that the exhaust performance at a time of starting is reduced in some degree. However, since a preliminary rotation is previously given to the turbine, a response at a time of starting the turbine is improved. In this embodiment, the same effect can be obtained even when placing in the junction portion shown in FIG. 23.

In accordance with the present invention, since it is possible to prevent the exhaust gas from being cooled by the turbocharger at a time of starting the engine, an early warm up of the main catalyst can be executed, the exhaust gas is purified and an amount of air in the stratified area is increased, so that the stratified area expands to the high output side and the fuel consumption is improved.

What is claimed is:

1. A direct gasoline injection type spark igniting internal combustion engine with turbocharger, said engine comprising a turbine of a turbocharger and a catalyst for purifying an exhaust gas which are provided in an exhaust gas passage, wherein said turbine is provided in an exhaust gas passage upstream of said catalyst, a pre catalyst assisting said catalyst is provided in a bypass exhaust gas passage bypassing said turbine, and wherein a control valve for controlling opening areas of both of an exhaust gas passage downstream of said pre catalyst and an exhaust gas passage downstream of said turbine is placed in a junction portion of the exhaust gas passages, said control valve shutting off the flow of the exhaust gas to the passage on the turbine side when starting and warming up the engine, and in remaining areas except the above, the opening of said control valve being controlled to be suitable for the operation of the engine in response to the operating condition of the engine.

2. A direct gasoline injection type spark igniting internal combustion engine with turbocharger as claimed in claim 1, wherein said control valve controls cross sectional areas of both of the exhaust gas passages from a position closing the downstream side exhaust gas passage of said pre catalyst to a position closing the downstream side exhaust passage of said turbine continuously or in incremental steps.

3. A direct gasoline injection type spark igniting internal combustion engine with turbocharger as claimed in claim 1, wherein said control valve controls cross sectional areas of both of the exhaust gas passages by using a cooling water temperature of the engine, an idle switch, an ON time of the idle switch, an exhaust gas pressure or a catalyst temperature as a parameter.

4. A direct gasoline injection type spark igniting internal combustion engine with turbocharger as claimed in claim 1, wherein the fuel is injected at two times comprising a compression stroke and an expansion stroke at a time of starting and warming up the engine.

5. A direct gasoline injection type spark igniting internal combustion engine with turbocharger as claimed in claim 1, wherein an air fuel ratio (A/F) is shifted to a rich side in an area that the engine rotational number increases over one half of the maximum rotational number.

6. A direct gasoline injection type spark igniting internal combustion engine with turbocharger, said engine comprising a turbine of a turbocharger and a catalyst for purifying an exhaust gas which are provided in an exhaust gas passage, wherein said turbine is provided in an exhaust gas passage upstream of said catalyst, a pre catalyst assisting said catalyst is provided in a bypass exhaust gas passage bypassing said turbine, and wherein a control valve for controlling opening areas of both of an exhaust gas passage downstream of said pre catalyst and an exhaust gas passage downstream of said turbine is placed in a junction portion of the exhaust gas passages, said control valve shutting off the flow of the exhaust gas to the passage on the turbine side when starting and warming up the engine, and in remaining areas except the above, the opening of said control valve being controlled to be suitable for the operation of the engine in response to the operating condition of the engine, wherein a control area for making the exhaust gas passage bypassing said turbine in a fully close state by said control valve is set to an area having a rotational number equal to or less than substantially one half of the maximum rotational number of the engine.

7. A direct gasoline injection type spark igniting internal combustion engine with turbocharger, said engine comprising a turbine of a turbocharger and a catalyst for purifying an exhaust gas which are provided in an exhaust gas passage, wherein said turbine is provided in an exhaust gas passage upstream of said catalyst, a pre catalyst assisting said catalyst is provided in a bypass exhaust gas passage bypassing said turbine, and wherein a control valve for controlling opening areas of both of an exhaust gas passage downstream of said pre catalyst and an exhaust gas passage downstream of said turbine is placed in a junction portion of the exhaust gas passages, said control valve shutting off the flow of the exhaust gas to the passage on the turbine side when starting and warming up the engine, and in remaining areas except the above, the opening of said control valve being controlled to be suitable for the operation of the engine in response to the operating condition of the engine, wherein a control area for making the exhaust gas passage bypassing said turbine in a fully close state by said control valve is set to be substantially equal to a stratified combustion are of the engine.

8. A direct gasoline injection type spark igniting internal combustion engine with turbocharger, said engine comprising a turbine of a turbocharger and a catalyst for purifying an exhaust gas which are provided in an exhaust gas passage, wherein said turbine is provided in an exhaust gas passage upstream of said catalyst, a pre catalyst assisting said catalyst is provided in a bypass exhaust gas passage bypassing said turbine, and wherein a separate portion for separating into said pre catalyst side exhaust passage and said turbine side exhaust passage upstream of said pre catalyst and said turbine is provided, and a control valve for controlling opening areas of both of said exhaust gas passages is placed in the separate portion, said control valve shutting off the flow of the exhaust gas to the passage on the turbine side when starting and warming up the engine, and in remaining areas except the above, the opening of said control valve being controlled to be suitable for the operation of the engine in response to the operating condition of the engine.

9. A direct gasoline injection type spark igniting internal combustion engine with turbocharger as claimed in claim 8, wherein the fuel is injected at two times comprising a compression stroke and an expansion stroke at a time of starting and warming up the engine.

10. A direct gasoline injection type spark igniting internal combustion engine with turbocharger as claimed in claim 8, wherein an air fuel ratio (A/F) is shifted to a rich side in an area that the engine rotational number increases over one half of the maximum rotational number.

11. A direct gasoline injection type spark igniting internal combustion engine with turbocharger, said engine comprising a turbine of a turbocharger and a catalyst for purifying an exhaust gas which are provided in an exhaust gas passage,
    wherein said turbine is provided in an exhaust gas passage upstream of said catalyst, and a pre catalyst assisting said catalyst is provided in a bypass exhaust gas passage bypassing said turbine,
    and wherein a control valve for controlling opening areas of both of the exhaust gas passages is placed in a junction portion of an exhaust gas passage downstream of said pre catalyst and an exhaust gas passage downstream of said turbine, a second bypass passage bypassing said turbine so as to confluent with the exhaust gas passage downstream of said turbine is provided, and an exhaust gas pressure control valve for controlling an exhaust gas amount flowing through said second bypass passage in correspondence to an exhaust gas pressure in said exhaust gas passage is provided.

12. A direct gasoline injection type spark igniting internal combustion engine with turbocharger as claimed in claim 11, wherein the fuel is injected at two times comprising a compression stroke and an expansion stroke at a time of starting and warming up the engine.

13. A direct gasoline injection type spark igniting internal combustion engine with turbocharger as claimed in claim 11, wherein an air fuel ratio (A/F) is shifted to a rich side in an area that the engine rotational number increases over one half of the maximum rotational number.

14. A direct gasoline injection type spark igniting internal combustion engine with turbocharger, said engine comprising a turbine of a turbocharger provided in an exhaust gas passage;
    a catalyst for purifying an exhaust gas, said catalyst being provided downstream of said turbine; and
    a pre catalyst corresponding to an assisting catalyst of said catalyst, said pre catalyst being provided in an upstream exhaust gas passage of said turbine,
    wherein a bypass passage connecting between said turbine and said pre catalyst and between said turbine and said catalyst is provided, and a control valve for controlling opening cross sectional areas of said turbine side exhaust passage and said bypass passage is placed in a separate portion of said bypass passages or a junction portion thereof, said control valve shutting off the flow of the exhaust gas to the passage on the turbine side when starting and warming up the engine, and in remaining areas except the above, said control valve is controlled in response to the operating condition of the engine.

15. A direct gasoline injection type spark igniting internal combustion engine with turbocharger as claimed in claim 14, wherein said control valve is controlled by using a cooling water temperature of the engine and an exhaust gas pressure of the exhaust gas passage as a parameter.

16. A direct gasoline injection type spark igniting internal combustion engine with turbocharger as claimed in claim 14, wherein the fuel is injected at two times comprising a compression stroke and an expansion stroke at a time of starting and warming up the engine.

17. A direct gasoline injection type spark igniting internal combustion engine with turbocharger as claimed in claim 14, wherein an air fuel ratio (A/F) is shifted to a rich side in an area that the engine rotational number increases over one half of the maximum rotational number.

18. A direct gasoline injection type spark igniting internal combustion engine with turbocharger, said engine comprising a turbine of a turbocharger and a catalyst for purifying an exhaust gas which are provided in an exhaust gas passage, and
    a pre catalyst assisting said catalyst, being provided between said catalyst and said turbine,
    wherein a bypass exhaust gas passage branching at an upstream portion of said turbine and confluenting between said turbine and said pre catalyst is provided, and a control valve for controlling an amount of an exhaust gas flowing through said bypass exhaust gas passage and said turbine side exhaust gas passage is placed in said branch portion or said junction portion, said control valve shutting off the flow of the exhaust gas to the passage on the turbine side when starting and warming up the engine, and in remaining areas except the above, the opening of said control valve being controlled to be suitable for the operation of the engine in response to the operating condition of the engine.

19. A direct gasoline injection type spark igniting internal combustion engine with turbocharger as claimed in claim 18, wherein the fuel is injected at two times comprising a compression stroke and an expansion stroke at a time of starting and warming up the engine.

20. A direct gasoline injection type spark igniting internal combustion engine with turbocharger as claimed in claim 18, wherein an air fuel ratio (A/F) is shifted to a rich side in an area that the engine rotational number increases over one half of the maximum rotational number.

21. A direct gasoline injection type spark igniting internal combustion engine with turbocharger, said engine comprising a turbine of a turbocharger; and
    a catalyst for purifying an exhaust gas;
    said turbine and said catalyst being placed in an exhaust gas passage in this order,
    wherein a bypass passage branching at an upstream portion of said turbine and confluent between said turbine and a pre catalyst is provided, and a control valve for controlling an amount of an exhaust gas flowing through said bypass exhaust gas passage and said turbine side exhaust gas passage is placed in said branch portion or said junction portion, said control valve shutting off the flow of the exhaust gas to the passage on the turbine side when starting and warming up the engine, and in remaining areas except the above, the opening of said control valve being controlled to be suitable for the operation of the engine in response to the operating condition of the engine.

22. A direct gasoline injection type spark igniting internal combustion engine with turbocharger as claimed in claim 21, wherein the fuel is injected at two times comprising a compression stroke and an expansion stroke at a time of starting and warming up the engine.

23. A direct gasoline injection type spark igniting internal combustion engine with turbocharger as claimed in claim 21, wherein an air fuel ratio (A/F) is shifted to a rich side in an area that the engine rotational number increases over one half of the maximum rotational number.

* * * * *